Oct. 16, 1928. 1,688,086
S. W. MAYHEW
DIRECTION INDICATOR FOR VEHICLES
Filed June 5, 1926 2 Sheets-Sheet 1
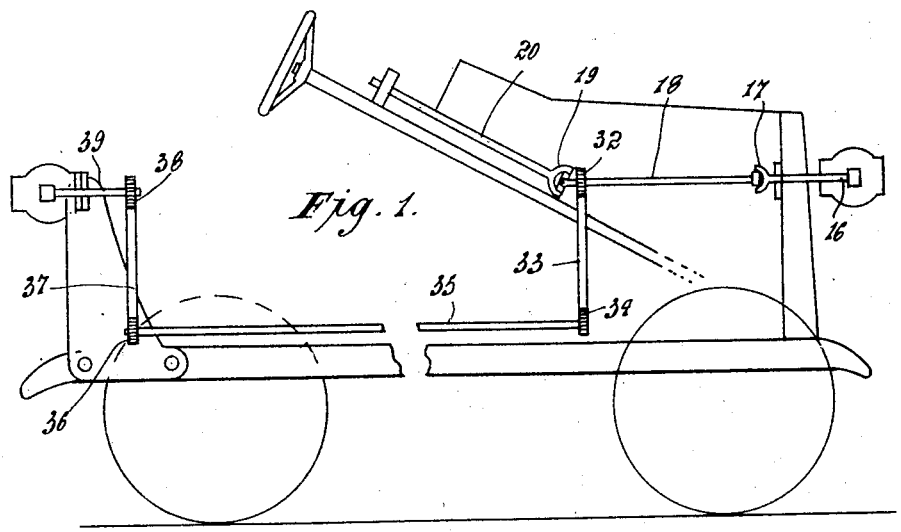
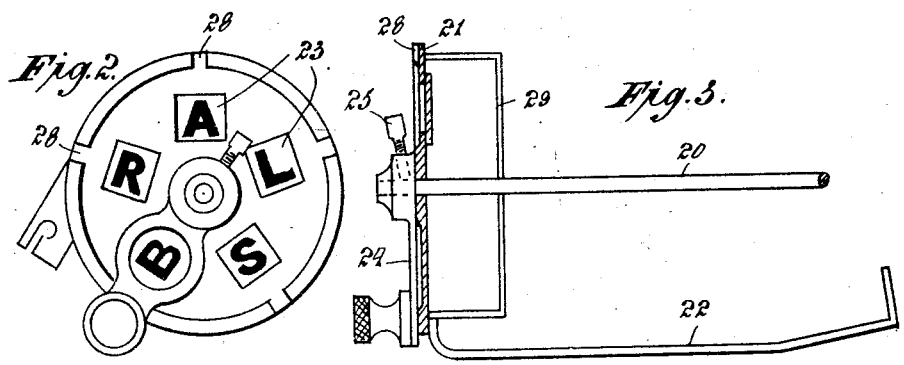
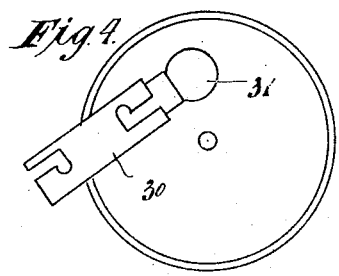
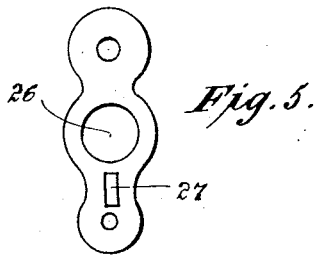
Inventor
S. W. Mayhew
by
Langner Parry Card & Langner
Attys.

Oct. 16, 1928.
S. W. MAYHEW
1,688,086
DIRECTION INDICATOR FOR VEHICLES
Filed June 5, 1926  2 Sheets-Sheet 2
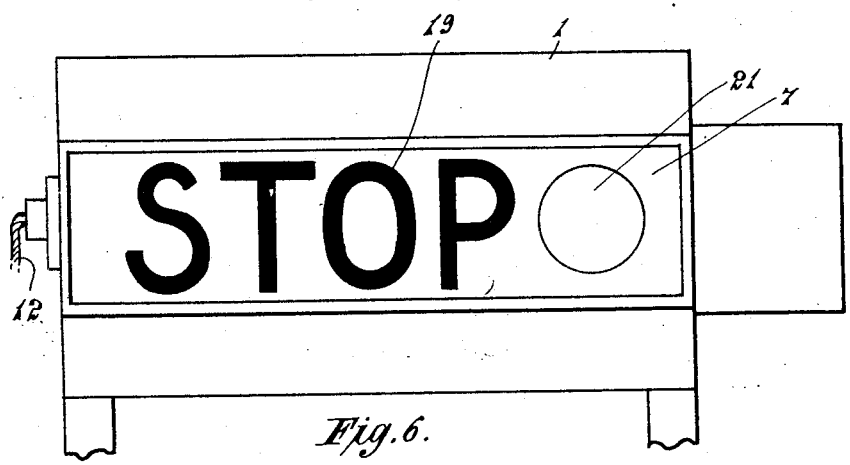
Fig. 6.
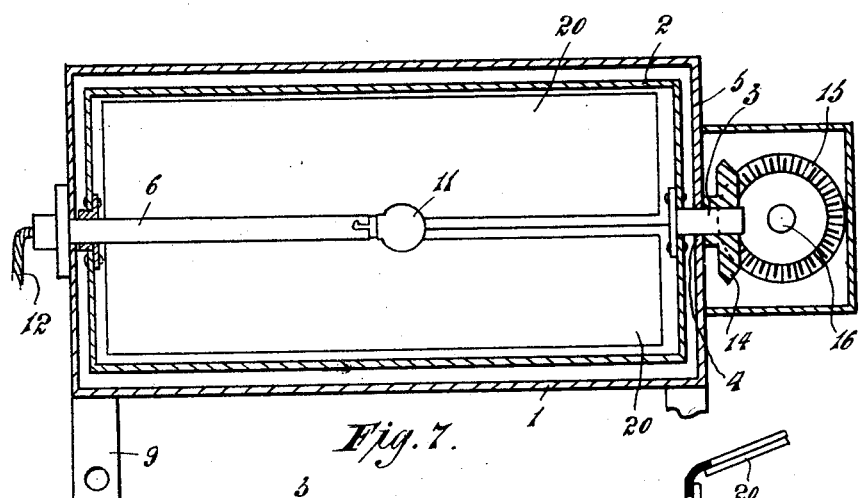
Fig. 7.
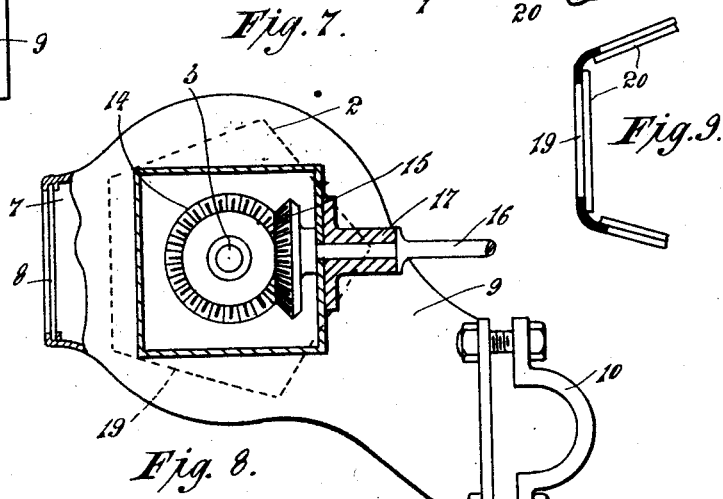
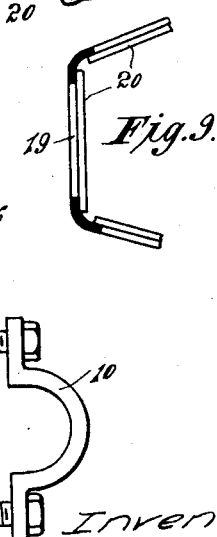
Fig. 9.
Fig. 8.
Inventor
S. W. Mayhew Patented Oct. 16, 1928.

1,688,086

UNITED STATES PATENT OFFICE.

SIDNEY WILLIAM MAYHEW, OF WAIUTA, NEW ZEALAND.

DIRECTION INDICATOR FOR VEHICLES.

Application filed June 5, 1926, Serial No. 113,943, and in New Zealand June 8, 1925.

This invention relates to indicators for indicating the intending direction of a vehicle, more particularly motor vehicles.

The object of the present invention is to enable the driver of a vehicle to indicate to persons on the road the direction he intends to take.

According to my present invention, a sided drum or roller is employed, suitably mounted in a box and adapted to rotate therein, such rotation being controlled from the instrument board of the vehicle. Each side of this drum is provided with the desired indicating matter, such as the words "Stop", "Back", "Right", "Left", and "Ahead". These are adapted to show white by day but to be illuminated by night. In the case of the first four of these, a circular red light would be shown at the end of each word by night.

One of these devices may be fixed on both the front and rear of the vehicle.

In construction the drum would be built up of separate sides, and each side has provided therein the lettering forming the desired word. This may be obtained by either cutting the letters in the wall of the drum and closing the openings thereof by a sheet of glass which will show white by day and luminous by night by means of a light within the drum. Similarly, the opening for the red light may be closed by a red glass.

An electric lamp is arranged within the drum and may be supported by a pipe which extends inwards from the end of the casing, and on which one end of the drum is journalled. The drum is rotated by means of bevel gears of which one would be fixed upon a spindle of the drum and the other mounted in a suitable bearing in the casing. This latter gear is adapted to be rotated by flexible steel wire leading to a disc mounted on the instrument board of the vehicle and operating in conjunction with a pointer and letters corresponding to the words on the drum, or by means of suitable rods and gearing.

Should the driver desire to indicate that he intends to turn to the left, he places the pointer opposite the letter "L" on the disc and the drum will then turn so as to expose the side containing the word "Left".

The invention will now be described with the aid of the accompanying drawings, wherein:—

Figure 1, is a side view showing the general arrangement of the device.

Figure 2, is a front view of an indicator disc.

Figure 3, is a sectional elevation thereof.

Figure 4, is a cross section.

Figure 5, is a view of a detail.

Figure 6, is a front elevation of the indicating device.

Figure 7, is a longitudinal sectional elevation thereof.

Figure 8, is a cross section on line A—A, Figure 2.

Figure 9, is a detail view of a section of the drum.

Referring first to Figures 6 to 8, an outer casing 1 has contained within it a five sided drum 2 which is mounted by means of a pin 3 projecting from the end of such drum 2 and adapted to rotate in a bearing 4 in an end wall 5 of the casing 1. The other end of the drum is rotatable upon a tube 6 projecting from the other end of the casing 1.

The front of the casing 1 has a longitudinal opening 7 adapted to be closed by a sheet of clear glass 8. Brackets 9 on the casing 1 enable the casing to be fixed to a convenient part of a vehicle by the aid of the clips 10.

The tube 6 extends into the drum and an electric lamp 11 is supported from the end of the tube, as shown, while the wires 12 to the lamp pass through the tube.

The drum is rotated by means of a bevel gear 14 fixed on the pin 3 and gearing with another bevel gear 15 mounted on a spindle 16 journalled in a bearing 17 fixed to the casing 1.

The drum 2 is built of five separate sides as shown, and each side may have letters cut therein, as in Figure 6, and the openings 19 of the letters closed by a sheet of glass 20 which is suitably secured against the sides of the drum and which would enable the letters to show white by day and luminous by night.

In the case of the words "Right", "Stop," "Back" and "Left," there would be an opening 21 which would be closed by a red glass so that attention is drawn to the device.

One of these devices may be mounted on both the front and rear ends of the vehicle, as shown in Figure 1, in which case the spindle 16 is connected by a universal joint 17 to a rod 18 and then by another universal joint 19 to a rod 20 which projects through a disc 21 fixed upon the steering column by means of a plate 22. The disc 21 has openings 23, shown in Figures 2 and 3, and behind these openings transparent plates having letters thereon corresponding to the words on the drum, e. g. "A" will indicate ahead; "R" right; "S" stop; "B" back; and "L" left. The letters may be opaque and transparent plates fixed behind the disc by means of any suitable adhesive or any other suitable means. On the end of the rod which projects through the disc an operating pointer handle 24 is fixed by a screw 25 and in the face of this handle an opening 26 is formed so that the letters can be viewed through the opaque opening.

The handle 24 is formed of a spring plate as shown, and has a projection 27 to engage in notches 28 as arranged opposite the initial letters. The rear side of the disc may carry a casing 29 into which is led a lamp socket 30 to receive an electric burner 31 so that the initial letters may be illuminated by night. The gears 14 and 15 are arranged so that they will rotate the drum to the positions indicated on the disc to correspond with the letters, when the handle 24 is rotated to the corresponding initial letter.

In the case of the indicator at the rear of the vehicle, this may be operated as shown in Figure 1 by means of a sprocket gear 32 on the rod 18 driving, by means of a sprocket chain 33, another sprocket wheel 34 fixed upon a longitudinal rod 35 at the end of which another sprocket gear 36 is fixed driving, by means of a sprocket chain 37, a sprocket gear 38 on the end of a rod 39 corresponding to the rod 16. By this arrangement both the devices at the front and rear of the vehicle will operate synchronously.

In place of the arrangement shown in Figure 1 the spindle 16 may be connected to a flexible steel wire which will lead to the disc 21 and be attached to the operating handle 24.

What I claim is:—

A direction indicator for vehicles comprising a polysided drum having an opening in each of said sides closed by translucent members bearing signals, a casing for enclosing said drum and permitting the same to rotate therein, said casing having a longitudinal opening in its side wall with which the openings in the drum may register, a transparent plate covering the opening in said casing, a tubular member extending through an opening in an end wall of the casing and rigid with the casing, and extending through an opening in the adjacent end wall of said drum and having said extended end lying within said drum, whereby said end of the drum is journalled, an outwardly-extending trunnion rigid with the other end wall of the drum and extending through an opening in said casing, whereby the other end of said drum is journalled, a drum actuating device comprising a rotary shaft operatively connected with said trunnion, a dial through which one end of said shaft extends and is rotatably journalled, resilient crank handle mounted on the end of said shaft and adjacent one face of said dial, said dial having a circumferential series of spaced openings therein covered by translucent plates bearing signal indicators corresponding to signal indicators on said drum, an opening in an arm of said crank handle to align with openings in said dial to indicate the position of said drum with respect to the opening in said casing, notches on the periphery of said dial, and a projection on said crank handle for co-operating with said notches to lock the crank handle in adjusted positions, and a light mounted behind said dial.

In testimony whereof, I have signed my name to this specification.

SIDNEY WILLIAM MAYHEW.